United States Patent [19]

Lamartino et al.

[11] 4,182,003
[45] Jan. 8, 1980

[54] FOOD PATTY MOLDING MACHINE

[75] Inventors: Salvatore P. Lamartino, Burbank; Louis R. Richards, Mokena; Glenn A. Sandberg, Lockport, all of Ill.

[73] Assignee: Formax, Inc., Mokena, Ill.

[21] Appl. No.: 882,121

[22] Filed: Feb. 28, 1978

[51] Int. Cl.² ............................................. A22C 7/00
[52] U.S. Cl. ...................................................... 17/32
[58] Field of Search ........................................... 17/32

[56] References Cited
U.S. PATENT DOCUMENTS

| | | | |
|---|---|---|---|
| 3,887,964 | 6/1975 | Richards | 17/32 |
| 4,054,967 | 10/1977 | Sandberg et al. | 17/32 |

Primary Examiner—Willie G. Abercrombie
Attorney, Agent, or Firm—Kinzer, Plyer, Dorn & McEachran

[57] ABSTRACT

A machine for molding hamburger patties and other similar food patties, of the kind incorporating a vacuum-intake plunger-type food pump that pumps food product from a supply hopper into mold cavities in a reciprocating mold plate, is equipped with a hydraulic drive system that drives both the food pump and a pair of feed screws that impel the food product toward the pump intake. The feed screws axes are approximately parallel to the direction of travel of the plunger and the outlet end of the feed screws is enclosed to preclude reverse movement of food product from the food pump into the supply hopper at the beginning of the pumping stroke; rotation of the feed screws is timed to coincide with the intake stroke of the pump in an arrangement that can be made to compensate for variations in pumped volume of the food product. A single hydraulic pump provides both a low-pressure hydraulic supply for plunger advance and a high-pressure hydraulic supply for plunger retraction and feed screw rotation. One electric motor powers both the hydraulic pump and a mechanical drive for the mold plate.

9 Claims, 9 Drawing Figures

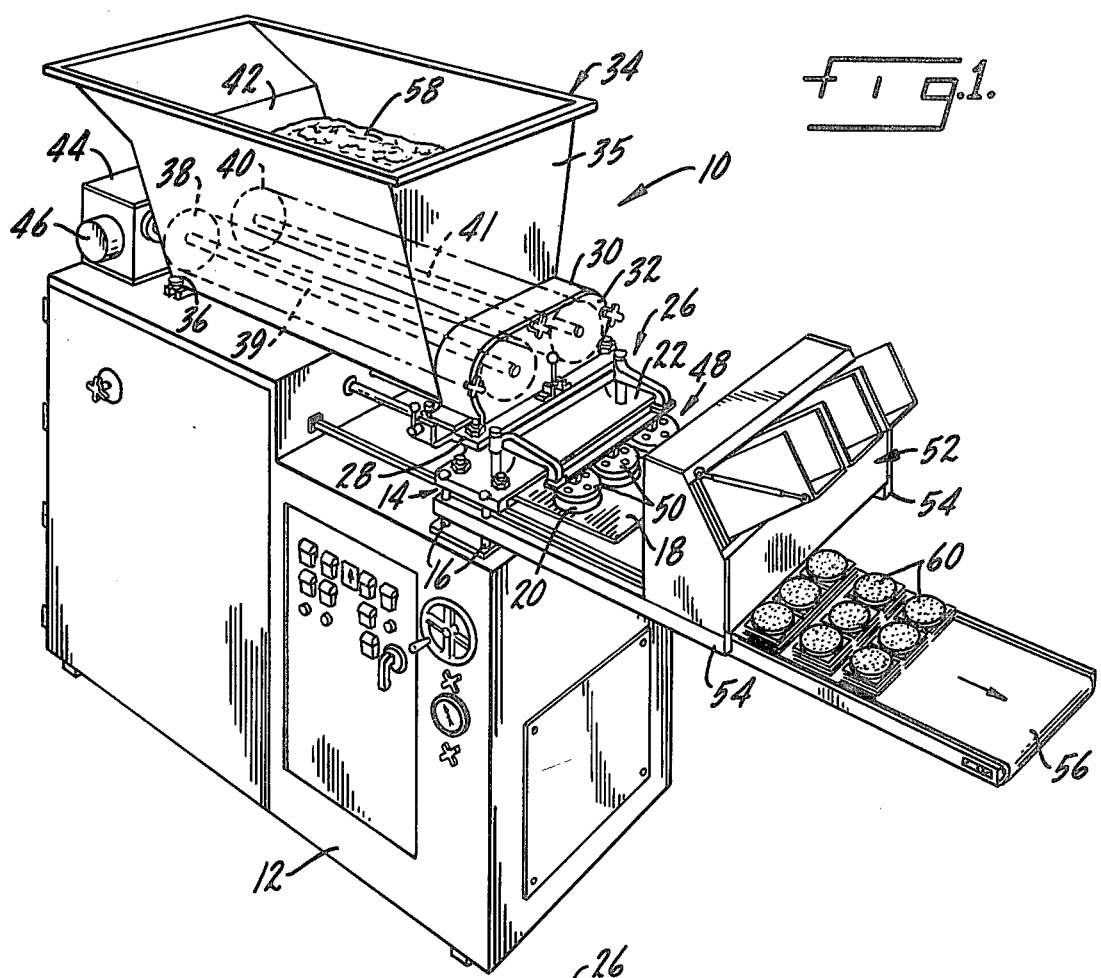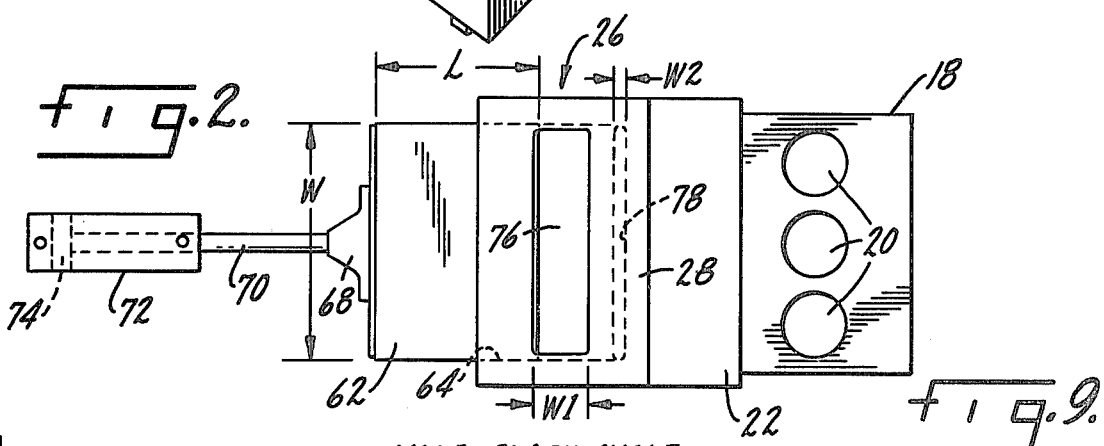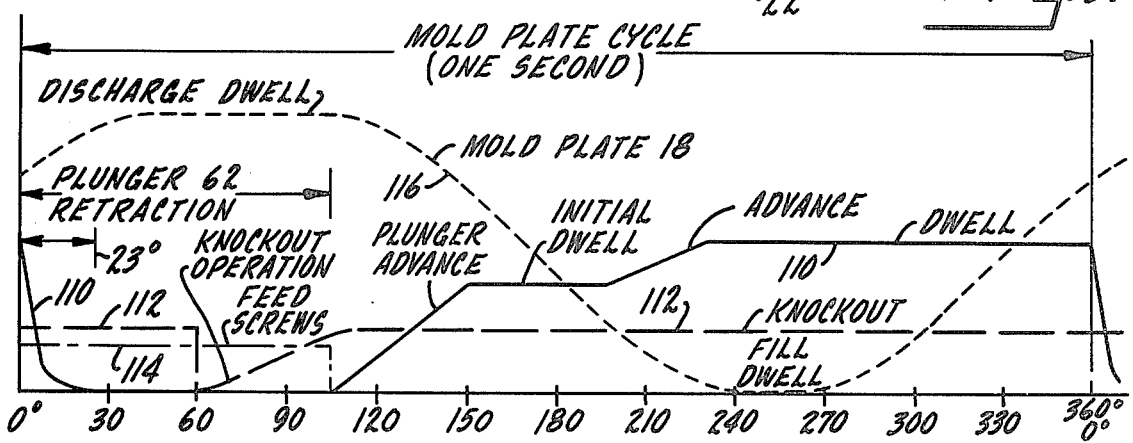

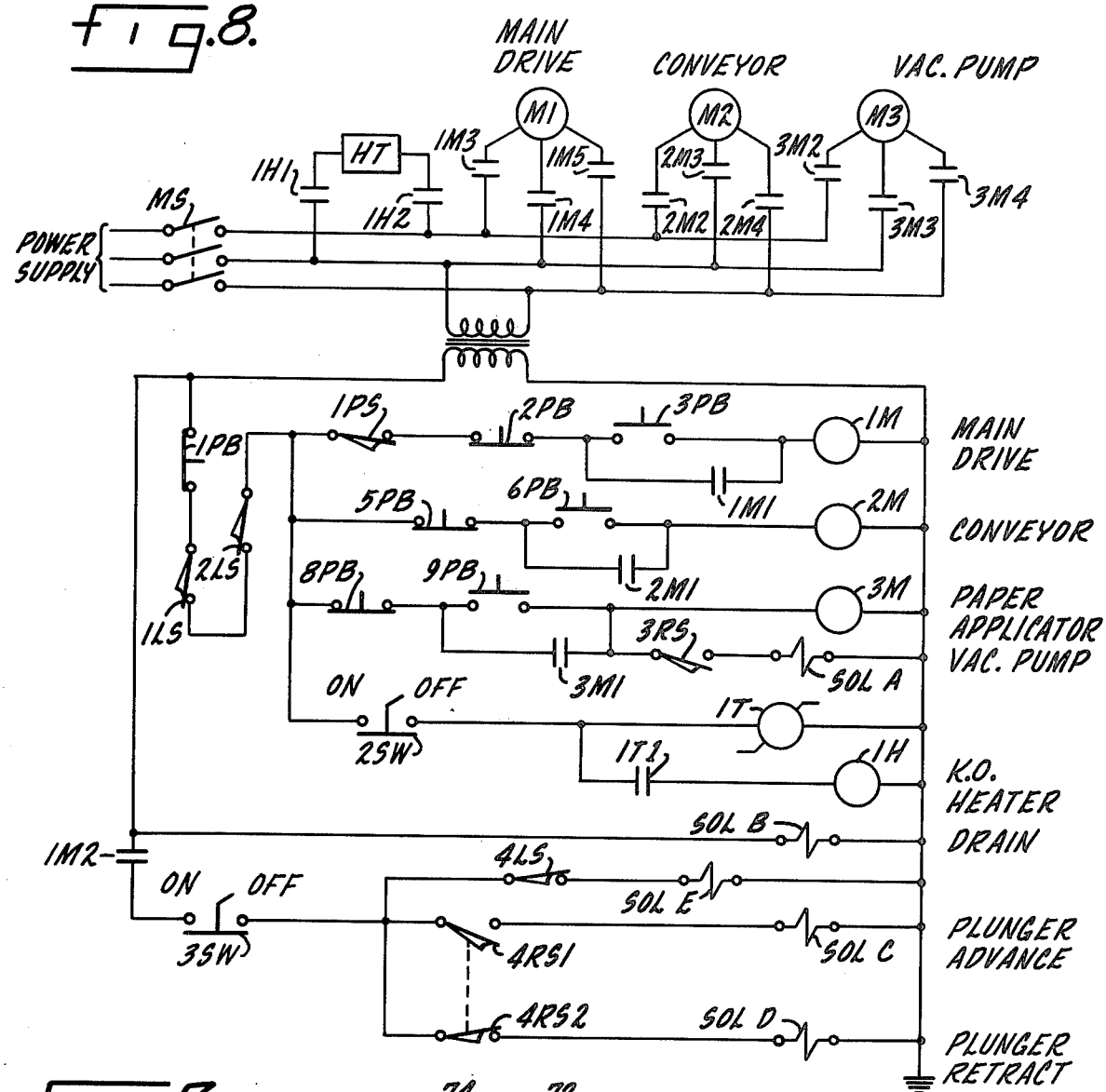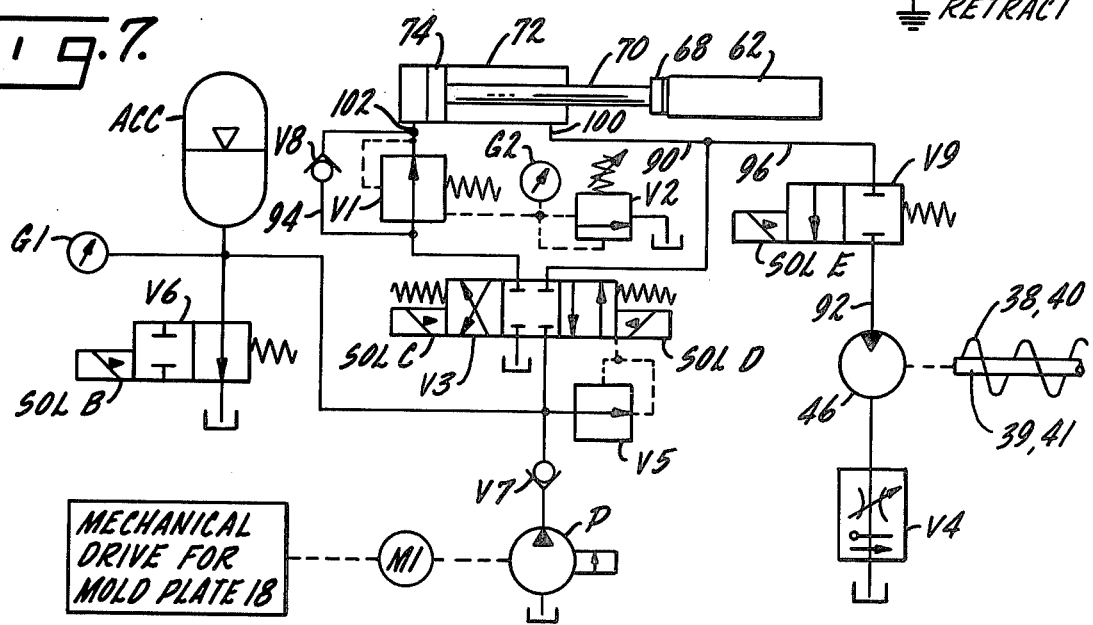

FOOD PATTY MOLDING MACHINE

BACKGROUND OF THE INVENTION

Hamburger patties are frequently manufactured at a central location, using high-speed high-volume patty molding machines, and subsequently distributed to restaurants, grocery stores, and other retail outlets. Patties of flaked or shredded meat, fish, and vegetable foods may also be handled in this manner. The term "food product", as used throughout this specification and in the appended claims, refers to any of the various foods identified above and to others having similar properties; these food products are not free-flowing, but rather are quite viscous and resistant to flow, and are only moderately compressible.

In many high-volume patty molding machines, the food product is fed from a supply hopper into a food pump by a positive feed mechanism that forces the food product into the pump intake. A positive feed of this kind is used to overcome the viscous, flow-resistant properties of the food product. The food pump forces the food product, under pressure, into a mold cavity in a mold plate that is moved cyclically between a fill position and a discharge position.

One problem encountered in these food patty molding machines is excessive "churning" or "working" of the food product by the food pump and its associated feed mechanism. Churning may be caused by the positive feeding action used to force the food product into the pump intake, with circulatory flow resulting because the feed mechanism cannot be precisely matched to the intake capacity of the pump. Another source of churning results from the tendency of the food pump to force food product back into the supply hopper, particularly when an open-intake plunger pump is employed. Churning tends to grind the food product into smaller particles than desired and may also cause separation of fat from other tissue in ground meat or separation of water from a fish or vegetable food product. A vacuum intake pump of the kind described and claimed in Sandberg et al U.S. Pat. No. 4,054,967 materially reduces the churning problem, as compared with forced-intake pumps, but may not eliminate it entirely.

In many of these machines a mold plate change may require adjustment of the pump cycle for the most efficient operation. Thus, if a thin mold plate with only two small cavities is replaced by a thick mold plate with three cavities of nearly the same diameter a much larger quantity of food product must be pumped in each cycle and the pump feed mechanism needs adjustment to assure adequate filling of the mold cavities. To a lesser extent, a change in the compressibility of the food product might also require adjustment. These adjustments have sometimes been difficult and time-consuming, particularly in coordinating separate adjustments for the food pump and its feed mechanism.

Hydraulically driven plunger-type food pumps are preferred, in food patty molding machines, because they permit effective operation at relatively low but constant pressures, a substantial advantage in avoiding undesirable bulges or "lips" on the food patties due to the action of entrained air. On the other hand, the efficiency of the plunger pump sometimes is lower than desired, requiring a relatively large pump for limited volumes of food product. This is particularly true with a vacuum-intake plunger pump if the pump allows any substantial quantity of the food product to be driven back into the supply hopper from the pumping chamber. Thus, although the quality of the patties may justify the expense, a vacuum intake pump may entail greater capital expenditure than is desirable (oversize motor, etc.). Furthermore, with a plunger-type food pump, the desirability of two operating pressures, a low pressure for the pump stroke of the plunger and a high pressure for rapid plunger retraction, tends to require capital expenditures of an undesirably high level.

SUMMARY OF THE INVENTION

It is a principal object of the present invention, therefore, to provide a new and improved food patty molding machine that effectively and inherently minimizes or eliminates the difficulties and disadvantages of previously known machines as discussed above.

It is a further object of the invention to provide a new and improved hydraulic drive system for a food patty molding machine of the kind that uses a vacuum-intake plunger-type food pump; the hydraulic drive system requires only a single hydraulic pump for driving both the food pump and a feed mechanism that advances food products to the pump intake. One electric motor drives the entire patty molding mechanism.

Another object of the invention is to provide a new and improved food pump construction for a high-volume food patty molding machine that retains the advantages of a vacuum intake but is more efficient in operation than previously known machines and that creates minimal churning as compared to previously known machines.

Another object of the invention is a new and improved hydraulic drive system for a food patty molding machine that inherently and automatically adjusts for changes in the required volume of the food product being processed, with respect to both the food pump and the feed mechanism for the food pump intake. A related object of the invention is to provide a hydraulic drive system that allows immediate and convenient adjustment of the rotational speed of one or more feed screws, employed as a feed mechanism for the food pump, while the machine is running.

Another object of the invention is to provide a new and improved food patty molding machine that affords improved efficiency and versatility of operation in a mechanism that is simpler, more economical, and easier maintained than previously known machines.

Accordingly, the invention is directed to a drive system for a food patty molding machine of the kind comprising a food product supply hopper, a feed screw for impelling food product generally horizontally along the bottom of the supply hopper toward the intake opening of a food pump chamber, a plunger for impelling food product through the pump chamber and into a mold inlet passage, a mold plate including a mold cavity, and a mold plate cycling mechanism for cyclically moving the mold plate outwardly from a fill position in which the mold cavity is aligned with the mold inlet passage to a discharge position in which the mold cavity is displaced from the inlet passage, and back inwardly from the discharge position to the fill position. The improved drive system comprises a double-acting plunger drive cylinder enclosing a piston, the piston being connected to the plunger, and hydraulic pump means affording a constant high pressure hydraulic supply and a low pressure hydraulic supply. A hydraulic drive motor is connected to the feed screw. Valve means are provided, having a first operating condition in which the low pressure hydraulic supply is connected to the plunger drive cylinder to advance the plunger toward the mold inlet passage in a pumping stroke, at a limited speed and under limited pressure, and a second operating condition in which the high pressure hydraulic supply is connected to the plunger drive cylinder to retract the plunger from the mold inlet passage in an intake stroke, at a high speed. The valve means, in its second operating condition, further connects one hydraulic supply to the feed screw drive motor to rotate the feed screw during the plunger intake stroke. Control means are provided to actuate the valve means between its first and second operating conditions in synchronism with the mold plate cycling mechanism so that the second operating condition is maintained during a limited portion of the mold plate cycle with the mold plate displaced from its full position, and the first operating condition is maintained during substantially the remainder of the mold plate cycle.

BRIEF DESCRIPTION OF THE DRAWINGS

FIG. 1 is a perspective view of a food patty molding machine constructed in accordance with a preferred embodiment of the invention, with some of the machine covers removed to reveal a portion of the operating mechanism;

FIG. 2 is a schematic plan view of the food pump and mold plate for the patty molding machine of FIG. 1;

FIG. 7 is a schematic diagram of the hydraulic drive system for the patty molding machine;

FIG. 8 is a simplified schematic drawing of the electrical control circuits for the patty molding machine; and FIG. 9 is a timing chart for the patty molding machine.

DESCRIPTION OF THE PREFERRED EMBODIMENT

Figure 3:
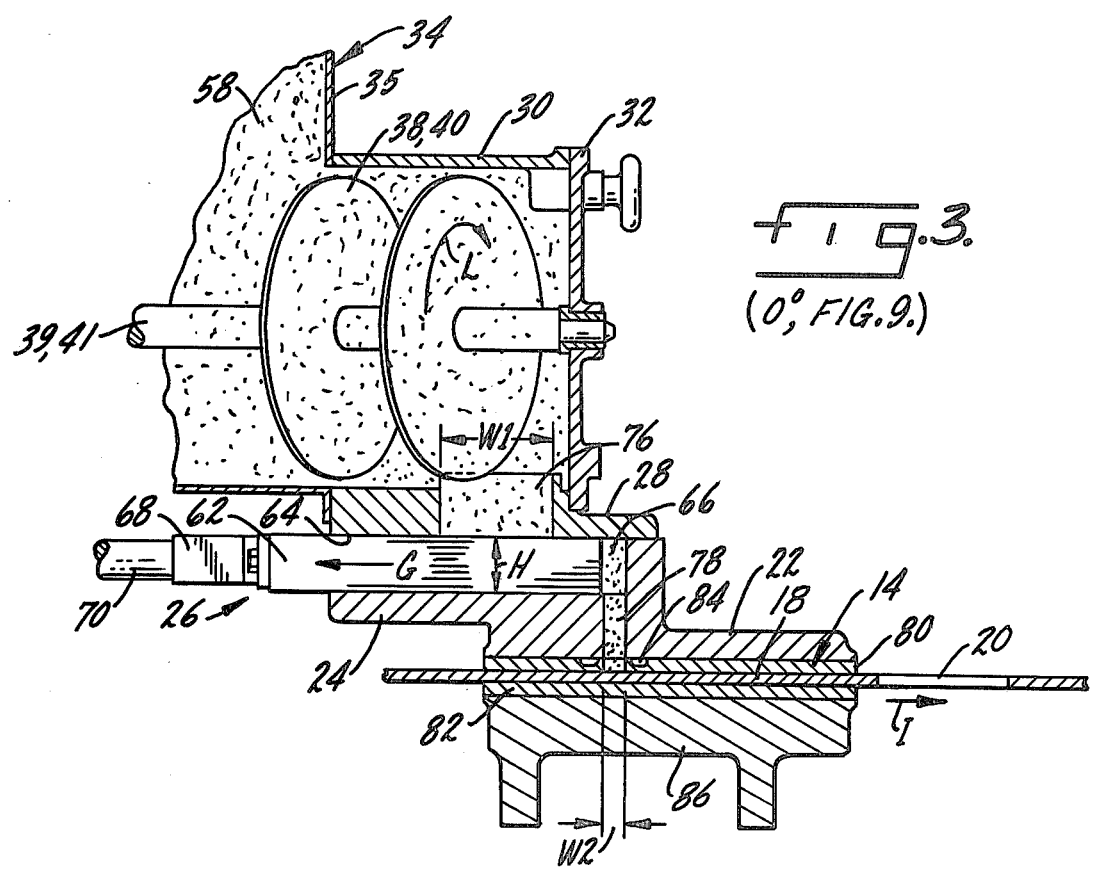
FIG. 3 is a sectional elevation view of the food pump and mold plate of the patty molding machine at the beginning of a patty molding cycle.

FIG. 1 affords a general illustration of a food patty molding machine 10 constructed in accordance with a preferred embodiment of the present invention. Near the right-hand end of the enclosed base 12 of molding machine 10 there is a mold plate guide structure 14 supported in part by a series of fixed, vertically extending posts 16. A mold plate 18 is slidably mounted in guide structure 14, as described more fully hereinafter in connection with FIGS. 2–6; mold plate 18 includes a plurality of mold apertures 20 that extend completely through the plate. In FIG. 1, mold plate 18 is shown in its fully extended discharge position, corresponding to the position illustrated in FIG. 6.

The cover plate 22 for the mold plate guide structure 14 is a part of a casting constituting the base 24 (see FIGS. 3-6) of the housing for a food pump 26. The cover 28 of the food pump housing also constitutes the base of a feed screw end housing 30. Housing 30 is equipped with a removable front cover 32. The feed screw end housing 30 is in direct communication with and projects outwardly of the front wall 35 of a food product supply hopper 34 that is mounted upon and extends for the major portion of the length of base 12 (FIG. 1). Hopper 34 is formed of sheet metal, preferably stainless steel, and is pivotally mounted on base 12 by appropriate means having a pivot point 36.

Two counter-rotating feed screws 38 and 40 (FIG. 1) extend the full length of the bottom of hopper 34. The feed screw shafts 39 and 41 each have one end journalled in a bearing in the front wall 32 of housing 30. The opposite ends of the feed screw shafts 39 and 41 project through the rear wall 42 of hopper 34 and into a gear box 44 mounted on top of base 12 at the extreme left-hand end of machine 10. Gear box 44 incorporates a right-angle gear drive connecting the shafts 39 and 41 to a hydraulic motor 46.

Returning to the right-hand top portion of base 12, in FIG. 1, it is seen that a knock-out mechanism 48 comprising a plurality of knock-out cups 50 is located just beyond food pump 26. The knock-out mechanism 48 is aligned with a paper applicator 52 mounted upon a pair of support rails 54 that project outwardly to the right of base 12. The knock-out mechanism 48 and paper applicator 52 are located above a takeaway conveyor 56; all three devices may be of conventional construction. Paper applicator 52 is preferably a vacuum sheet application of the kind disclosed in Richards et al U.S. Pat. No. 3,952,478.

In general terms, the operation of the patty molding machine 10 corresponds to the machines described in Richards et al U.S. Pat. No. 3,887,964 and Sandberg et al U.S. Pat. No. 4,054,967. A quantity of ground meat or other food product 58 is deposited in supply hopper 34; in one commercial embodiment of machine 10 hopper 34 has a capacity of five hundred pounds of ground meat. The two feed screws 38 and 40 advance the food product into the feed screw end housing 30, which leads directly to the intake of food pump 26. Mold plate 18 is driven cyclically between the discharge position shown in FIG. 1 and a fill position in which the mold cavities 20 are located immediately below food pump 26 in alignment with a mold inlet passage that constitutes the outlet of pump 26. In each cycle of operation of mold plate 18, therefore, mold cavities 20 are pumped full of food product 58 by pump 26, following which the mold plate is moved outwardly to the discharge position where the patties formed in the mold cavities are discharged by knock-out cups 50 onto conveyor 56. In machine 10, as illustrated, a sheet of paper is applied to each patty by paper applicator 52. The operation of conveyor 56 may be arranged to advance the conveyor only after a given number of cycles of mold plate 18 so that the food patties 60 emerge on the conveyor in stacks as shown in FIG. 1.

The construction and operation of the mold-filling mechanism of molding machine 10, comprising mold plate 18, food pump 26, and the feed screws 38 and 40, can best be understood by reference to FIGS. 2–6. As shown therein, food pump 26 includes a plunger 62 which projects through an end opening 64 into a pump cavity or chamber 66 defined by the pump housing cover 28 and base 24. Plunger 62 is of relatively thin, flat configuration; the height H of the plunger is quite small in relation to its length L and width W (FIGS. 2 and 3). Plunger 62 is connected by a yoke 68 to a piston rod 70 that extends into a double-acting hydraulic cylinder 72 and is connected to a piston 74 within the cylinder (FIG. 2).

The pump box housing cover 28 has an intake opening 76 that extends for approximately the full width W of plunger 62, as shown in FIG. 2. The width W1 of opening 76 is made relatively large to provide free access for movement of food proudct 58 from the interior of feed screw housing 30 into pump chamber 66 (FIG. 3). The opposite end of pump chamber 66 is in communication with a long, narrow mold inlet passage 78 (FIGS. 2 and 3); passage 78 extends downwardly through pump base 24 and constitutes the outlet for pump 26. Passage 78 has a width W2 (FIG. 3) that is substantially smaller than the width W1 of the pump intake passage 76.

As best shown in FIG. 3, the mold plate guide structure 14 includes an upper guide plate 80 and a lower guide plate 82, with mold plate 18 disposed in close-fitting sliding relation between the two guide plates. The mold inlet passage 78 continues downwardly through the upper guide plate 80 into communication with mold plate 18. Preferably, guide plate 80 incorporates the pressure-relief construction described and illustrated in Richards U.S. Pat. No. 4,097,961, as indicated by the relief channels 84. A heavy, rigid base member 86 completes the mold plate guide structure.

The overall construction and operation of the molding mechanism illustrated in FIGS. 2–6 is generally similar to the corresponding mechanism shown in Sandberg et al U.S. Pat. No. 4,054,967, but there are several important differences. Thus, in the mold-filling mechanism of the present invention, plunger 62 is arranged to travel horizontally instead of vertically. Of greater importance is the fact that the end portions of the feed screws 38,40 are aligned along axes parallel to the direction of movement of plunger 62 instead of approximately normal thereto. This enables the feed screws to function much in the manner of a gate valve with respect to the intake opening 76 for pump chamber 66.

Figure 4:
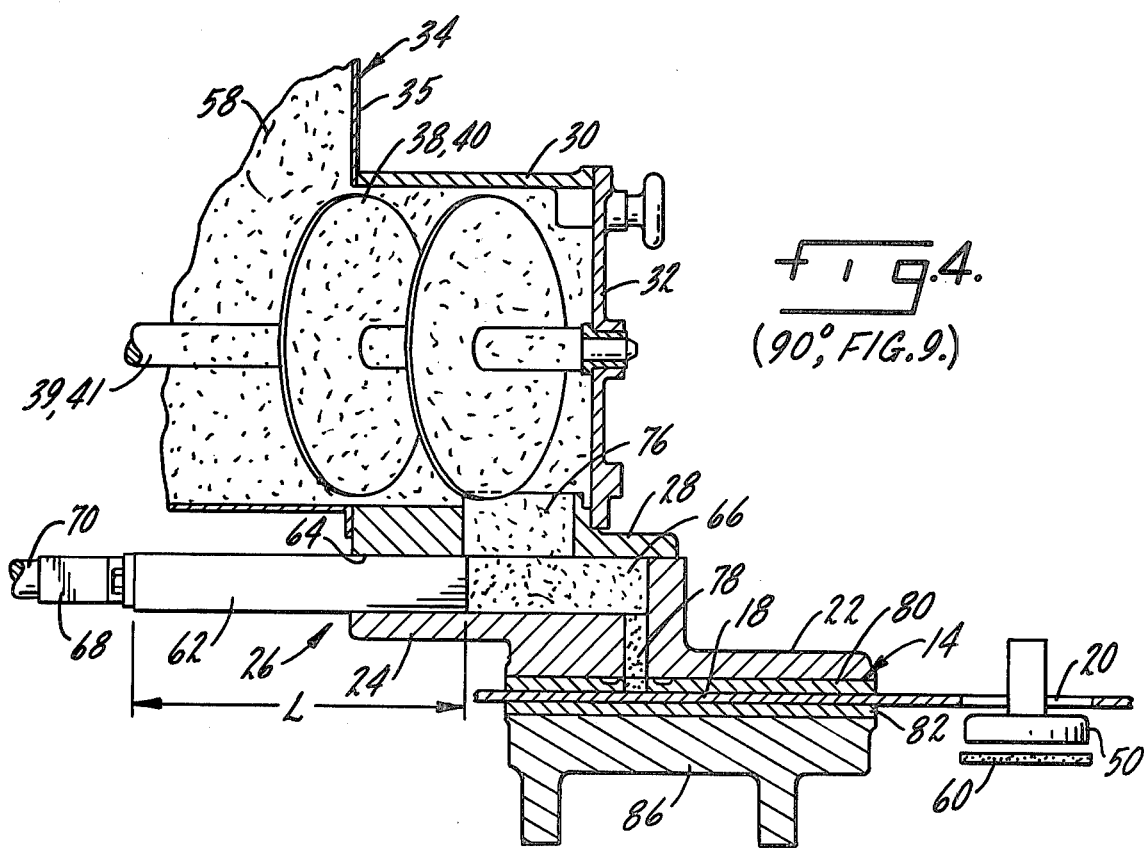
FIGS. 4, 5 and 6 are sectional elevation views similar to FIG. 3 showing successive stages in the molding cycle.

A complete mold cycle is shown in FIGS. 3 through 6, which correlate with the timing chart of FIG. 9. At the beginning of the cycle, FIG. 3, plunger 62 has just begun an intake stroke, starting to move in the direction of the arrow G. This retraction movement of plunger 62, from the position of FIG. 3 to that of FIG. 4, is carried out at a high speed, preferably in excess of one hundred fifty feet per minute, creating a partial vacuum within chamber 66 to draw food product 58 from housing 30 into chamber 66. Throughout the short time interval in which plunger 62 is retracted, feed screws 38 and 40 are maintained in operation (arrow L) to keep housing 30 filled with meat product 58. However, the feed screws do not force food product into chamber 66 to a material extent; it is the vacuum created by rapid retracting movement of plunger 62 that fills the pump chamber.

At the time pump chamber 66 is being filled with food product 58, mold plate 18 is moving outwardly in the direction of arrow I (FIG. 3). Ultimately, this movement of the mold plate brings the mold cavities 20 into alignment with the knockout cups 50, as shown in FIG. 4. At this time the knockout mechanism 48 (FIG. 1) is actuated to drive the knockout cups downwardly through the mold plate cavities 20, discharging the patties 60 as shown in FIG. 4.

Figure 5:
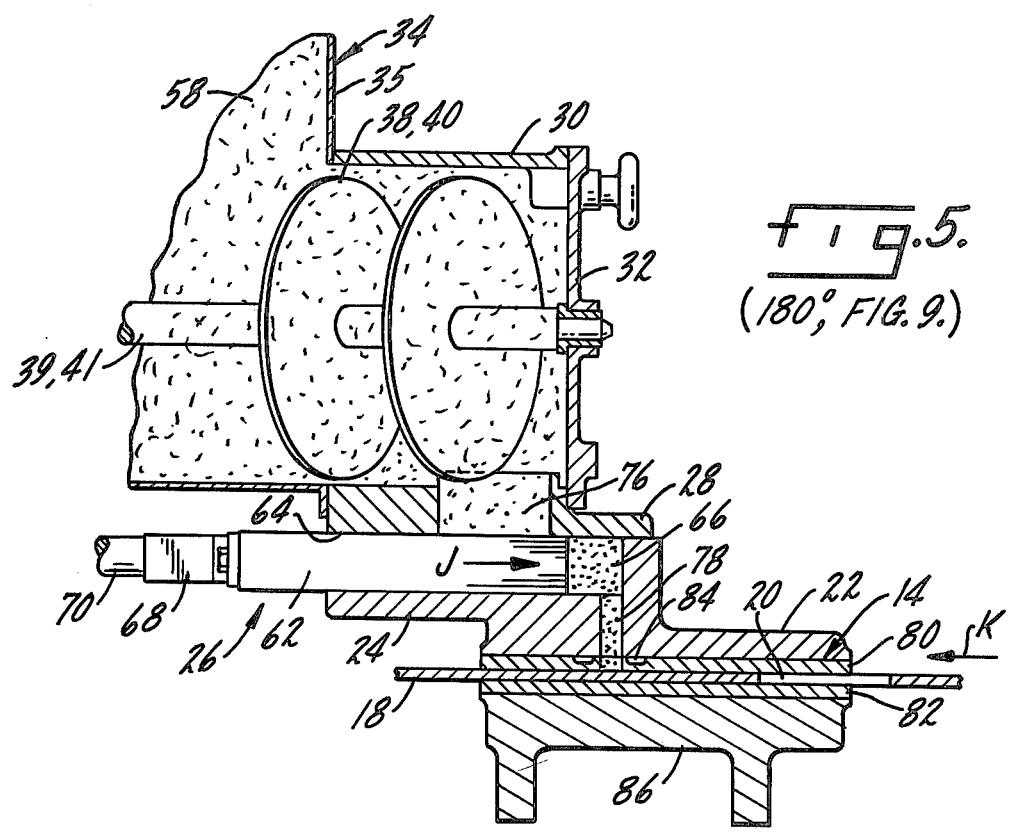

After the knockout operation, at about 105° of the operating cycle (FIG. 9), plunger 62 begins a pumping stroke, moving in the direction of the arrow J toward the position shown in FIG. 5. During the pumping stroke of plunger 62, reverse movement of food product 58 out of chamber 66 is blocked by feed screws 38 and 40 (which are now stationary) and the food product 58 contained in housing 30. The confinement or blocking effect of feed screws 38 and 40 and the food product in housing 30 is such that there is little tendency for reverse pumping of food product from chamber 66 back through the pump intake opening 76. Instead, the food product is sheared along the level of the top of plunger 62 and is compressed in the forward end of chamber 66. The speed of movement of plunger 62 in its pumping stroke in the direction of arrow J is lower than the retraction speed in the direction of arrow G. Furthermore, a moderate constant pressure is maintained on the food product in chamber 66, during the pumping stroke in FIGS. 5 and 6, by the hydraulic drive system of machine 10, as described more fully hereinafter.

The automatic gate valve action of housing 30 and feed screws 38 and 40, with respect to food pump 26, is of substantial advantage in minimizing and virtually eliminating churning of the food product at the pump intake. The alignment of the feed screw shafts 39 and 41 parallel to the direction of movement of plunger 62, in conjunction with the close fitting feed screw housing 30 in the immediate area of the pump intake, affords a substantially more effective anti-churning effect than has been achievable with more conventional arrangements in which the feed screw is aligned approximately at right angles to the direction of plunger movement. Furthermore, the short confined portion of the two feed screws within housing 30 does not create the potentiality of excessive churning or working of the food product that is presented in prior art arrangements of feed screws that are closely confined for a substantial portion of their lengths.

The ideal condition is to provide an effective gate valve at the pump intake opening 76 without the complication and expense of a mechanically movable plate or other valve structure. That ideal is closely approached by the illustrated pump structure. On the other hand, retention of the advantages of this arrangement of the feed screws and food pump depends to a substantial extent on limiting the operation of the feed screws to a minimum, because the more the feed screws are run the greater the agitation of food product 58 and the greater the possibility of induced deterioration.

Figure 6:
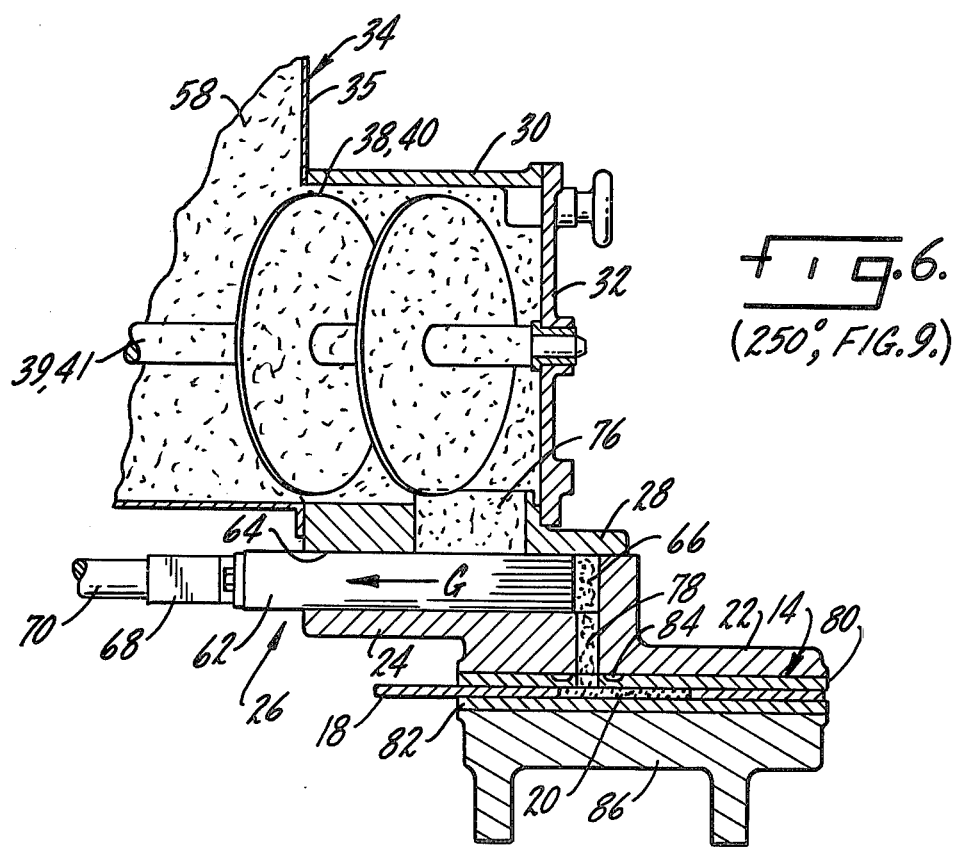

The final stage of the molding cycle, shown in FIG. 6, is essentially conventional. Mold plate 18 has moved inwardly to its fill position, from the discharge position shown in FIG. 4, as indicated by arrow K in FIG. 6. As the mold cavities 20 enter alignment with passage 78, approaching the fill position, food product 58 is pumped through passage 78 to fill the mold cavities. This completes the pumping stroke of plunger 62, the final plunger position (FIG. 6) depending upon the total mold cavity volume. From the position of FIG. 6, mold plate 18 moves back toward the position shown in FIG. 3 to initiate another mold cycle.

FIG. 7 illustrates the hydraulic drive for patty molding machine 10. The hydraulic drive comprises a pump P driven by an electrical motor M1. Motor M1 is also the drive motor for the mechanical drive mechanism for mold plate 18. The drive mechanism for the mold plate may be a cam drive of the general kind described and illustrated in Sandberg et al. U.S. Pat. No. 4,054,967 and, consequently, has not been shown in detail.

Pump P is a pressure compensated pump providing a constant-pressure output. In one commercial machine, for example, the output pressure of pump P is adjustable over a range of about 1500 to 2100 lbs/sq. in., and usually operates near 2000 p.s.i. The output of pump P is connected through a check valve V7 to an accumulator ACC. A gauge G1 is provided to enable the operator to monitor the output pressure. The accumulator is also connected to a drain valve V6 actuated by a solenoid SOL B.

The accumulator ACC and pump P are also connected to a three-position control valve V3 that can be actuated by either one of two solenoids SOL C and SOL D. Valve V3 is a solenoid and pilot actuated valve, the pilot actuation being provided through a valve V5 connected to the output of pump P and to accumulator ACC.

The main control valve V3 is connected to one port 102 of the pump plunger drive cylinder 72 through a pressure reducing valve V1. In one commercial version of the patty molding machine, the output pressure of valve V1 is typically maintained at about 1500 p.s.i. Valve V1 is connected to a second pressure reducing valve V2, with a return from valve V2 to the hydraulic fluid reservoir. Valve V2 affords a remote control, accessible to the machine operator, for fine adjustment of the outlet pressure of valve V1. A gauge G2 is provided to permit the operator to monitor the pressure supplied to port 102 of cylinder 72 through valve V1. That pressure can be of critical importance because it is directly proportional to the effective pumping pressure applied to the food product; inadequate or excessive pressure produces a poor product. In the commercial machine referred to above, the ratio is 10:1. A check valve V8 is connected in parallel with valve V1 in a drain line 94 for cylinder port 102.

The main control valve V3 is connected to the other port 100 of cylinder 72 by a high pressure line 90. Line 90 is also connected to the hydraulic motor 46 that drives feed screws 38 and 40. The outlet line 92 from pump 46 is returned to the hydraulic system reservoir by an adjustable temperature and pressure compensated flow control valve V4, employed to adjust the rate of rotation of the feed screws.

The cyclic operation of the hydraulic drive system illustrated in FIG. 7 can best be understood by reference to the electrical control for that system, shown in FIG. 8, and to the timing diagram of FIG. 9. Referring to FIG. 8, the machine operator, to initiate operation, closes a master switch MS. This energizes the solenoid SOL B for drain valve V6, actuating the drain valve to its closed condition.

Next, the operator closes a start switch 3PB to energize a main drive control relay coil 1M through a circuit that includes three safety interlock switches 1LS, 2LS and 1PS, a main drive stop switch 2PB, and an emergency stop switch 1PB. With coil 1M energized, its contacts 1M1 close to afford a holding circuit; another set of contacts 1M2 also close. Furthermore, motor M1 is energized by closing of the relay contacts 1M3 through 1M5. With motor M1 energized, pump P is in operation (FIG. 7) and supplies hydraulic fluid to accumulator ACC, affording a build-up of fluid pressure in the accumulator.

Next, the machine operator closes a start switch 6PB (FIG. 8) to energize a conveyor control relay coil 2M. Contacts 2M1 close to afford a holding circuit for coil 2M and contacts 2M2 through 2M4 are closed to energize a conveyor motor M2. For stacking operations, a different control circuit may be provided; since such circuits are well known the stacker control for the conveyor has not been illustrated.

Next, the machine operator closes switch 9PB to energize the operating coil 3M of a paper applicator vacuum pump control relay. The contacts 3M1 of this relay close to afford a holding circuit and the contacts 3M2 through 3M4 provide an energizing circuit for a vacuum pump motor M3. Operation of the paper applicator is further controlled by a rotary timing switch 3RS connected to a solenoid SOL A. Switch 3RS rotates in synchronism with the mechanical drive for mold plate 18, maintaining the paper applicator operation in properly timed relation to the cyclic operation of the mold plate.

The machine operator also actuates a switch 2SW to its "ON" position to energize the operating coil 1T of a timing relay. The contacts 1T1 of this timing relay are connected to the operating coil 1H of a knock-out heater control relay. Whenever the control relay coil 1H is energized, its contacts 1H1 and 1H2 close to energize a knock-out heater HT.

The patty molding machine has now been fully conditioned for cyclic operation, and this is initiated by the operator throwing a switch 3SW to its "ON" position. Switch 3SW is connected to two sets of contacts of a rotary timing switch 4RS. Switch 4RS, like switch 3RS, is driven from the mechanical drive for mold plate 18; the arrangement of the switch contacts is such that the contacts 4RS1 are open whenever the switch contacts 4RS2 are closed, and vice versa. Switch contacts 4RS1 are connected to the solenoid SOL C of the main control valve V3 (FIG. 7) and switch contacts 4RS2 are connected to the other control solenoid SOL D for the main control valve.

The timing chart of FIG. 9 starts with the molding mechanism approximately in the position shown in FIG. 3, with plunger 62 advanced and mold plate 18 moving outwardly, but at a time prior to the downward movement of knock-out cups 50. More specifically, the starting point for FIG. 9 is the instant of initiation of retracting movement of plunger 62, effected by the closing of switch 4RS2 and energization of solenoid SOL D, with a coincident opening of switch 4RS1 to deenergize SOL C (FIG. 8). At this point, control valve V3 (FIG. 7) is shifted to the left and high pressure hydraulic fluid is supplied through control valve V3 and line 90 to the right-hand port 100 of cylinder 72. At the same time, the left-hand port 102 of cylinder 72 is connected to the hydraulic reservoir through check valve V8, bypassing valve V1, and through valve V3. Piston 74 is driven to the left at a high speed, preferably 150 ft/min. or more, beginning the intake stroke of plunger 62.

As shown in FIG. 9, the retracting movement of plunger 62, represented by curve 110, occurs while mold plate 18 is completing its movement to the discharge position; mold plate movement is illustrated by curve 116. Retraction is completed in a very short interval, approximately twenty-three degrees in a cycle lasting only one second. Plunger 62 (curve 110) remains retracted for substantially longer interval, beginning its advance or pump stroke at about one hundred four degrees. In the meantime, the knock-out mechanism, movements of which are represented by curve 112 in FIG. 9, completes its operation. Throughout the interval during which plunger 62 is moved to and retained in its retracted position, the two feed screws 38 and 40 are rotated, as indicated by curve 114 in FIG. 9.

The initiation of advance movement of plunger 62 occurs when switch 4RS is again actuated; contacts 4RS1 close to energize SOL C and contacts 4RS2 open to de-energize SOL D. Valve V3 shifts to the right, connecting port 100 of cylinder 72 to the reservoir and supplying fluid at reduced pressure (e.g., about 1500 psi) to the left-hand cylinderport 102. This action coincides approximately with the beginning movement of mold plate 18 from its discharge position toward its fill position; compare curves 110 and 116 (FIG. 9). As plunger 62 moves forward, it reaches a point at which the food product ahead of the plunger is fully compressed (see FIG. 5), producing an initial dwell in curve 110 (FIG. 9). As the mold plate approaches its fill position, portions of the mold cavities come into initial communication with passage 78 as in FIG. 4, and an additional advancing movement of the plunger occurs. The plunger reaches a further dwell position (FIG. 6) when the mold cavities are filled, with the mold plate in its fill position. At about 270° the mold plate begins its outward movement toward discharge position. Thereafter, the cycle repeats, beginning with a further actuation of switch 4RS (FIG. 8).

From the foregoing description, it is seen that the drive system of the present invention requires only one hydraulic pump, the pump P of FIG. 7. That same pump is utilized to afford a high pressure hydraulic supply for rapid retraction of plunger 62 and a low pressure supply, governed by valves V1 and V2, for the advance or pump stroke of the plunger. Furthermore, the same hydraulic pump operates as the hydraulic supply for the motor 46 that drives the pump feed mechanism comprising feed screws 38 and 40. The single electric motor M1 drives the entire patty molding mechanism, including the food pump, the pump feed mechanism, the mold plate, and the knock-out mechanism.

If mold plate 18 is changed to provide mold cavities of appreciably greater capacity, the retracting movement of plunger 62 is lengthened because the plunger moves further into chamber 66 (FIG. 5) in completing the filling of the mold cavities. By driving feed screws 38 and 40 only during the actual retracting movement of plunger 62, the operating interval for the feed screws can be made directly proportional to the retraction interval for the food pump plunger. Thus, an additional control valve V9 actuated by a solenoid SOL E can be interposed in line 96 between the main control valve V3 and hydraulic motor 46 (FIG. 7). The solenoid SOL E is connected in an operating circuit (FIG. 8) that includes a limit switch 4LS which opens only when plunger 62 is fully retracted. Thus, valve V9 is normally open to allow a flow of hydraulic fluid to motor 46, but closes when plunger 62 reaches its full retracted position.

In this manner, patty machine 10 can be made to compensate automatically for volume changes in the mold cavities. On the other hand, if changes in product consistency or other factors dictate, the rotational speed of the feed screws can be adjusted, independently of the rest of the drive system, simply by adjusting valve V4 (FIG. 7). Food product pressure is readily controlled by valve V2, adjusting the outlet pressure for valve V1.

The food pump of molding machine 10 on the other hand, retains the advantages of a vacuum intake, particularly with respect to minimization of churning, while affording more efficient operation than previously known machines. This improvement is based upon the gate valve effect afforded by the alignment of feed screws 38 and 40 along axes parallel to the direction of movement of pump plunger 62, together with the enclosure 30 around only a limited portion of the feed screws immediately adjacent pump intake 76 (FIGS. 3-6). Nevertheless, the entire construction of the patty molding machine is simpler and more economical than most previously known machines, and maintenance is both convenient and effective.

I claim:

1. A drive system for a food patty molding machine of the kind comprising a food product supply hopper, a feed screw for impelling food product from the supply hopper toward the intake opening of a food pump chamber, a plunger for impelling food product through the pump chamber and into a mold inlet passage, a mold plate including a mold cavity, and a cyclic mold plate drive mechanism for moving the mold plate outwardly from a fill position in which the mold cavity is aligned with the mold inlet passage to a discharge position in which the mold cavity is displaced from the inlet passage, and back inwardly from the discharge position to the fill position, the drive system comprising:
    a double-acting plunger drive cylinder enclosing a piston, the piston being connected to the plunger;
    a hydraulic pump means affording a constant high pressure hydraulic supply and a low pressure hydraulic supply;
    a hydraulic drive motor connected to the feed screw;
    control valve means having a first operating condition connecting the low pressure hydraulic supply to the plunger drive cylinder to advance the plunger toward the mold inlet passage in a pumping stroke, at a limited speed and under limited pressure, and a second operating condition connecting the high pressure hydraulic supply to the plunger drive cylinder to retract the plunger from the mold inlet passage in an intake stroke, at a high speed;
    the valve means, in its second operating condition, further connects one hydraulic supply to the feed screw drive motor to rotate the feed screw during the plunger intake stroke; and
    control means to actuate the valve means between its first and second operating conditions in synchronism with the mold plate cycling mechanism so that the second operating condition is maintained during a limited portion of the mold plate cycle with the mold plate displaced from its fill position, and the first operating condition is maintained during substantially the remainder of the mold plate cycle.

2. A drive system for a food patty molding machine, according to claim 1, in which the hydraulic pump means comprises:
    a pressure-compensated hydraulic pump having an adjustable high pressure output comprising the high pressure supply; and
    an adjustable pressure reduction valve, connected to the hydraulic pump, comprising the low pressure supply.

3. A drive system for a food patty molding machine, according to claim 1, and further comprising a single electric drive motor driving both the hydraulic pump means and the mold plate drive mechanism.

4. A drive system for a food patty molding machine, according to claim 1, and further comprising an adjustable flow control valve, connected to the feed screw drive motor, for adjusting the rotational speed of the feed screw independently of the remainder of the drive system.

5. A drive system for a food patty molding machine, according to claim 1, in which the control means includes means to interrupt operation of the feed screw upon completion of the intake stroke of the plunger, so that the interval during which the feed screw operates in each cycle is determined by the interval required for the plunger intake stroke.

6. In a food patty molding machine of the kind comprising a food product supply hopper, a food pump chamber having an intake opening at one end of the hopper, a plunger, reciprocally movable through the pump chamber between a retracted intake position and a range of advanced pressure positions, for impelling food product through the pump chamber into a mold inlet passage, a mold plate including a mold cavity, and a cyclic mold plate drive for moving the mold plate between a fill position aligned with the mold inlet passage and a discharge position displaced from the mold inlet passage, an improved food pump and pump feed mechanism comprising:

at least one feed screw extending through the hopper, one end of the feed screw terminating immediately adjacent the intake opening of the food pump chamber, the axis of the feed screw being generally parallel to the path of movement of the plunger;

a feed screw end housing, constituting a part of the supply hopper, closely encompassing the one end of the feed screw for only a limited distance immediately adjacent the intake opening of the food pump chamber;

plunger drive means for cyclically driving the plunger through an intake stroke to its retracted intake position and a pumping stroke to its advanced pressure position range, in one-to-one synchronism with the mold plate drive, the intake stroke being at a speed sufficient to develop a partial vacuum in the chamber and thereby draw food product from the feed screw end housing through the intake opening into the pump chamber; and feed screw drive means for rotating the feed screw only during intervals in which the plunger is moving toward and remains in its retracted intake position, whereby the feed screw, the feed screw end housing, and food product retained in the end housing function as a gate valve generally precluding reverse movement of food product out of the pump chamber back to the supply hopper during movement of the plunger toward its advanced pressure positions.

7. A food pump and pump feed mechanism for a food patty molding machine, according to claim 6, in which the plunger moves along a horizontal path, and in which the feed screw axis is horizontally aligned along the bottom of the supply hopper.

8. A food pump and pump feed mechanism for a food patty molding machine, according to claim 6, in which the plunger drive means comprises a hydraulic drive cylinder, the feed screw drive means comprises a hydraulic drive motor, and the pump drive cylinder and feed screw drive motor are energized from a common hydraulic supply comprising only one hydraulic pump.

9. A food pump and pump feed mechanism for a food patty molding machine, according to claim 8, in which the feed screw drive means includes auxiliary control means to stop rotation of the feed screw, in each cycle, when the plunger reaches its retracted intake position.

* * * * *